July 8, 1958     J. W. PALM     2,842,241

OVERCENTER CLUTCH LEVER ARRANGEMENT

Filed April 19, 1955

Inventor:
James W. Palm
By:
N. J. Schmid Atty.

United States Patent Office 2,842,241
Patented July 8, 1958

2,842,241

OVERCENTER CLUTCH LEVER ARRANGEMENT

James W. Palm, Rockford, Ill., assignor to Borg-Warner Corporation, Chicago, Ill., a corporation of Illinois Application April 19, 1955, Serial No. 502,422

3 Claims. (Cl. 192—93)

This invention relates to a friction clutch and more particularly to a friction clutch having an operating mechanism of the over-center cam lever type for operating the clutch and embodying spring means for resiliently loading the engaged clutch and carried by an adjusting device for compensating for clutch plate wear.

Friction clutches embodying the operating mechanism described, conventionally employ Belleville washer type springs for resiliently loading the engaged clutch. These springs are generally employed in such clutches to insure maximum compactness of the clutch as required by space limitations in machines, such at automotive vehicles. It has been found that such springs are restricted in their inherent flexibility in relation to their thickness, as the pounds per square inch in pressure increases with their thickness and thereby with consequent inability to retain compactness of the clutch when the pounds per square inch in pressure are of considerable magnitude.

It is an object of the present invention to provide a spring arrangement capable of producing large pressures, for resiliently loading an engaged clutch, in relation to the size of the springs.

Another object of the invention is to provide a spring arrangement embodying leaf spring segments annularly arranged on a support and disposed between the support and a wear plate, to yieldably resist movement of the pressure member toward the support by the over-center lever arrangement engaging the wear plate and pressure plate.

Still another object of the invention is to provide an adjusting ring and a support therefor embodying spring means in an assembly which is relatively compact in construction and which may be incorporated in over-center lever type clutches without greatly increasing the cost thereof.

These and other features and objects of the invention will become apparent from the following description when taken together with the accompanying drawings which form a part thereof and in which.

The novel leaf spring segment construction of this invention may be incorporated in friction clutches of the type shown in the Ruesenberg et al. Patent No. 2,129,361 and the Carlson Patent No. 2,613,778 and is adapted to replace the adjusting ring and the Belleville type spring washer shown therein. The structure shown in Figure 1 of the drawings is, except for the adjusting ring and the spring construction, substantially the same as that shown in the Ruesenberg et al. patent heretofore mentioned and reference is made thereto for the details of the clutch construction and the operation thereof.

Figure 1:
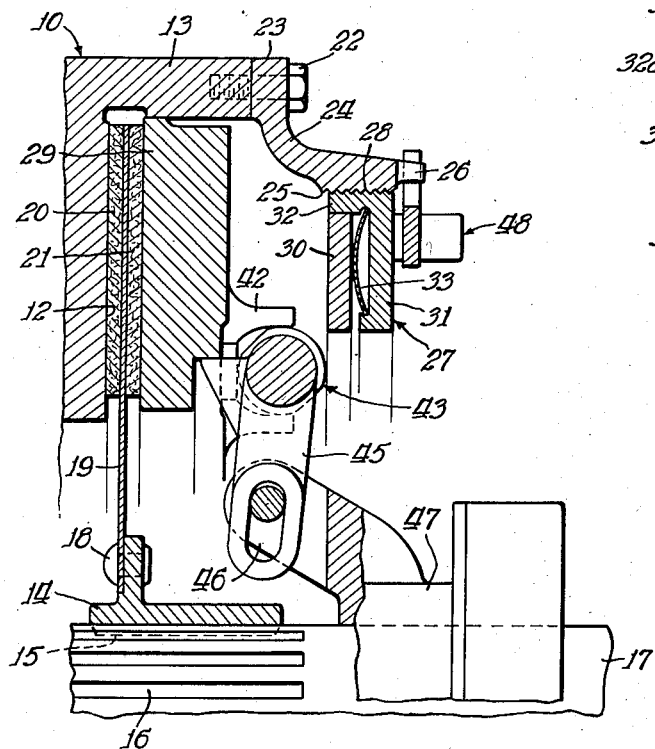
Figure 1 is a partial side sectional elevation of a clutch employing the novel spring arrangement constructed in accordance with the teachings of this invention.
Figure 2:
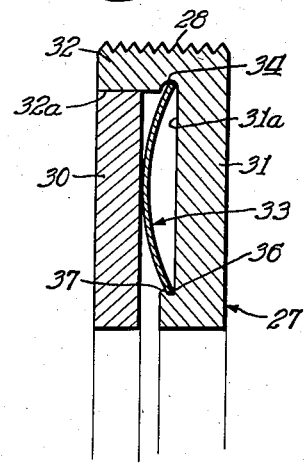
Figure 2 is a greatly enlarged cross section of the novel spring, support and wear plate construction.

With regard to the instant invention, it will suffice to say that Figure 1 shows a fly-wheel 10, or other engine driven member, having a friction surface at 12 and a flange 13. Concentric with the fly-wheel 10 is a hub 14 having internal splines 15 in operative engagement with external splines 16 on a driven shaft 17. Secured to the hub 14, as by rivets 18 or other suitable fasteners, is a disc 19 having an annular portion which is commensurate with the friction surface 12 of the fly-wheel 10 and is covered on both sides with suitable friction material 20 and 21.

Secured to the flange 13 by bolths 22 or otherwise, is a flanged ring 23, the flange portion 24 of which is provided with fine threads 25, and the extremity of which is notched at 26 for a purpose to be hereinafter described. An adjusting ring 27, externally threaded at 28 and engaged with the threads 25 of the ring 23, is positioned within the flange 24.

Between the ring 23 and the friction surface 21 of the disc 19, is located a pressure plate 29 supported on the flange 13 of the fly-wheel for axial movement. The pressure plate 29 is provided with circumferentially spaced tongues and the ring 23 is provided with corresponding forks which engage the tongues and constitutes a driving connection between the pressure plate 29 and the ring 23, as described in the aforementioned Ruesenberg et al. patent. Likewise, a clearance is provided between the end of each tongue and the bottom of each fork to allow the pressure plate 29 to move axially into and out of engagement with the friction surface 21. The pressure plate 29 is normally maintained out of contact with the friction surface 21 by means, such for example, light torsion springs (not shown).

The threaded adjusting ring 27 is substantially L-shaped in cross section and comprises angularly arranged plate and cylindrical portions 31 and 32. An annular wear plate 30 is received within the cylindrical portion of the ring, the outer circumferential edge of the plate being in slidable engagement with the surface 32a of the ring 27. Annularly disposed between the wear plate 30 and the plate portion 31 of the adjusting ring are a plurality, such for example, twenty, annularly spaced leaf spring segments 33. The spaced leaf spring segments 33 are retained in their proper position by an annular retaining groove 34 formed in the ring member 27 at the juncture of the surface 31a of the plate portion 31 and the surface 32a of the cylindrical portion 32, and an annular groove 36, located at the radially inner edge of the plate portion, may be formed, for example, by rolling over the edge 37 of the plate portion as illustrated. It should be obvious, however, that the groove 36 could be machined or otherwise formed in the ring 27. The spring segments 33 are received in an annular array about the plate 27 in the grooves 34 and 36 in unloaded condition. It will be noted that the radially inner and outer rolled edge and the cylindrical portion of the ring 27 define a channel in the ring 27.

Figure 3:
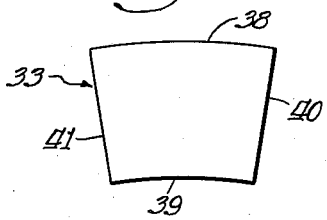
Figure 3 is a plan view of one of the leaf spring segments employed in this invention.
Figure 4:
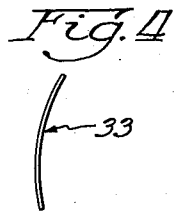
Figure 4 is an end view of the leaf spring segment shown in Figure 3.

Each of the spring segments 33, as illustrated in Figures 3 and 4, are defined by arcuate segmental sides 38 and 39 and by straight radial sides 40 and 41. Looking at one of the radial surfaces, the segments have an arcuate cross section, as illustrated in Figure 4.

Projecting to the right from the pressure plate 29 are a plurality of bearings 42 in which are journaled cams 43. The cams 43 bear against the ring or wear plate 30 and also against the bottom of the bearings 42 and are employed to urge the pressure plate 29 toward the fly-wheel 10 to engage the clutch.

It is to be understood that as many cams may be used to operate the pressure plate as are required. In Figure 1 only one cam is shown and this cam is located at the end of a rod 44 formed integrally with lever 45. The end of the lever 45 is suitably connected to a toggle 46, or other means, through a sleeve 47 slidable on the shaft 17. The sleeve 47 may be connected in any convenient manner to an exterior reciprocal control lever (not shown).

Movement of the pressure plate 29 against the friction surface 21 is obtained through an increase in the distance between the pressure plate and the ring 30 and it is necessary to provide some means for adjusting the position of the ring 30 with respect to the friction surface 12 of the fly-wheel 10. Such adjustment is provided by means of the aforementioned adjusting ring 27 and is accomplished by rotating the adjusting ring 27 with respect to the flange 24 of the ring 23. Suitable means, generally indicated at 48, engaged in one of the slots 26, are provided for locking the adjusting ring 27 against further rotation with respect to the flange 24 after the proper adjustment has been secured. The locking means not being a part of this invention, further description is deemed unnecessary.

Once the proper adjustment of the adjusting ring 27 with respect to the friction surface 12 of the fly-wheel 10 is obtained no further adjustment will be required for a considerable period. This is brought about by the construction of the ring 30, the spring segments 33 and the adjusting ring member 27. There will necessarily be a number of cams 43 in contact with the ring 30 and the initial adjustment of the adjusting ring 27 will be such that the ring 30 will be as close as possible to the surface 12 of the fly-wheel 10 and, therefore, the spring segments previously described disposed between the adjusting ring member 27 and the ring 30 will be compressed therebetween. Since the spring segments are originally disposed within their retained grooves 34 and 36 in an unloaded condition, the adjusting of the ring member 27 toward the pressure plate surface 12 will cause a loading of the spring segments and the ring member will tend to move toward the left as shown in Figure 1. The ring 30 therefore acts as a spring cushion and as wear occurs thereon, the spring segments 33 will tend to move the ring member to the left and the wear on the plate or member 30 will be compensated for by such movement. As is obvious, the ring 30 is not merely a stop member against which the cam or cams 43 are rotated but is a take up member for wear on the cams.

In a preferred embodiment of the invention, each of the segmental spring segments is .042" thick with a height, looking at one radial edge, of 5/32 of an inch. For such a spring segment a deformation of .013" will produce a loading pressure of 100 pounds. The below reproduced table sets forth the loading pressures of twenty spring segments produced by various deformations thereof.

1000 lbs. at .0065 inch deformation
2000 lbs. at .013 inch deformation
4000 lbs. at .026 inch deformation
5000 lbs. at .033 inch deformation The loading pressure is directly proportional to the deformation of the spring segments and to the number of spring segments at any particular deformation. The latter is borne out by a comparison of the loading pressure of one segment at .013" deformation and the loading pressure at the same deformation for twenty spring segments.

Specific reference has been made to the use of twenty spring segments of a particular height; however, it is to be expressly understod that a larger or a lesser number of spring segments with the same or different height could be employed without departing from the spirit of this invention.

The invention has been particularly described with reference to the aforementioned Ruesenberg et al. patent but it is to be expressly understood that the adjusting ring and its associated spring segments is equally applicable for use in the aforementioned Carlson patent, the specific reference of the Ruesenberg et al. patent merely facilitating the description.

It is also to be expressly understood that the foregoing description is merely illustrative of a preferred embodiment of the invention and that the scope of the invention is not to be limited thereto, but is to be determined by the appended claims.

I claim:

1. In an over-center friction clutch, a driven member, a driving member, a pressure plate, a ring member adjustably secured to said driving member and having an axially extending cylindrical portion and a radially extending plate portion, said plate portion being provided with means defining radially spaced annular grooves therein; an annular plate member slidably disposed within said cylindrical portion adjacent said pressure plate and spaced from said plate portion, a plurality of annularly arranged spaced leaf spring segments retained in said means defining said grooves for urging said plate member towards said pressure plate, said spring segments being radially curvilinear in section; cam means disposed between said pressure plate and said plate member for operating said pressure plate to press said driven member against said driving member for rotation therewith, and means for operating said cam means, said plate member and said spring segments resiliently loading said clutch.

2. An over-center friction clutch comprising a rotating fly-wheel and a member adapted to be frictionally engaged therewith for conjoint rotation; an axially movable element; cam means for axially moving said element for causing said fly-wheel and said member to be in engaged relation; means for operating said cam means; and means for resiliently loading said clutch comprising a ring element adjustably secured to said fly-wheel and having an axially extending cylindrical portion and a radially extending plate portion; said plate portion being provided with means defining radially spaced annular grooves therein, an annulus slidably disposed within said cylindrical portion positioned adjacent said movable element, and an annular array of spaced leaf spring segments retained in said grooves and interposed between said plate portion and said annulus for urging said annulus towards said axially movable element, said spring segments being radially curvilinear in section.

3. In an over-center friction clutch, a driven member, a driving member, a pressure plate, a ring member adjustably secured to said driving member and having an axially extending cylindrical portion and a radially extending plate portion, said plate portion being provided with means defining radially spaced annular grooves therein; an annular plate member slidably disposed within said cylindrical portion adjacent said pressure plate and spaced from said plate portion, a plurality of annularly arranged spaced leaf spring segments each of which produces a biasing force substantially directly proportional to the deformation thereof and substantially equal to the biasing force of each of the other spring segments, said segments being retained in said means defining said grooves for urging said plate member towards said pressure plate, said spring segments being radially curvilinear in section; cam means disposed between said pressure plate and said plate member for operating said pressure plate to press said driven member against said driving member for rotation therewith, and means for operating said cam means, said plate member and said spring segments resiliently loading said clutch.

References Cited in the file of this patent

UNITED STATES PATENTS 2,129,361     Ruesenberg et al. _____ Sept. 6, 1938
2,251,367     Miller _____ Aug. 5, 1941